(12) United States Patent
Mollet et al.

(10) Patent No.: US 10,887,969 B2
(45) Date of Patent: Jan. 5, 2021

(54) METHOD FOR CONTROLLING THE LIGHT INTENSITY OF A FACILITY, AND ASSOCIATED SYSTEM

(71) Applicant: TECHNIP FRANCE, Courbevoie (FR)

(72) Inventors: Céline Mollet, Marly-le-Roi (FR); Claude Dreschel, Maisons Laffitte (FR)

(73) Assignee: TECHNIP FRANCE

( * ) Notice: Subject to any disclaimer, the term of this patent is extended or adjusted under 35 U.S.C. 154(b) by 0 days.

(21) Appl. No.: 16/646,214

(22) PCT Filed: Sep. 13, 2018

(86) PCT No.: PCT/EP2018/074797
§ 371 (c)(1),
(2) Date: Mar. 11, 2020

(87) PCT Pub. No.: WO2019/053154
PCT Pub. Date: Mar. 21, 2019

(65) Prior Publication Data
US 2020/0275543 A1    Aug. 27, 2020

(30) Foreign Application Priority Data

Sep. 15, 2017 (FR) ..................................... 17 58572

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 47/105* | (2020.01) |
| *A01K 29/00* | (2006.01) |
| *A01K 45/00* | (2006.01) |

(52) U.S. Cl.
CPC .......... *H05B 47/105* (2020.01); *A01K 29/00* (2013.01); *A01K 45/00* (2013.01)

(58) Field of Classification Search
CPC ....... H05B 47/105; A01K 29/00; A01K 45/00
See application file for complete search history.

(56) References Cited

U.S. PATENT DOCUMENTS

| | | | |
|---|---|---|---|
| 5,450,063 A * | 9/1995 | Peterson | A01M 29/16 119/713 |
| 2010/0102759 A1 | 4/2010 | Donners et al. | 315/312 |
| 2020/0053850 A1 * | 2/2020 | Fredricks | A01K 63/006 |

OTHER PUBLICATIONS

International Search Report dated Nov. 15, 2018 in corresponding PCT International Application No. PCT/EP2018/074797.
Written Opinion dated Nov. 15, 2018 in corresponding PCT International Application No. PCT/EP2018/074797.

(Continued)

*Primary Examiner* — Anh Q Tran
(74) *Attorney, Agent, or Firm* — Ostrolenk Faber LLP (57) ABSTRACT

A method that includes the following steps: determination of predictive meteorological data in a region surrounding the facility; querying of a database about the presence of birds in the region surrounding the facility; calculation, by a prediction unit, of the probability of birds passing opposite the facility as a function of time, on the basis of the predictive meteorological data and data relating to the presence of birds in the region surrounding the facility; and control, by a control unit, of at least one light source of the facility, on a basis of the probability of passage, calculated by the prediction unit.

15 Claims, 4 Drawing Sheets

(56) References Cited

OTHER PUBLICATIONS

Search Report dated May 9, 2018 in corresponding French Patent Application No. 17 58572.
Written Opinion dated May 9, 2018 in corresponding French Patent Application No. 17 58572.

* cited by examiner

METHOD FOR CONTROLLING THE LIGHT INTENSITY OF A FACILITY, AND ASSOCIATED SYSTEM

CROSS-REFERENCE TO RELATED APPLICATIONS

The present application is a 35 U.S.C. §§ 371 national phase conversion of PCT International Application No. PCT/EP2018/074797, filed Sep. 13, 2018, which claims priority to French Patent Application No. 17 58572, filed Sep. 15, 2017, the contents of which are incorporated herein by reference. The PCT International Application was published in the French language.

TECHNICAL FIELD

The present invention relates to a method for controlling the light intensity of a facility.

The facility is in particular a facility arranged in a body of water, such as a platform or a barge, or a land facility. The facility is in particular intended for fluid prospecting, production and/or recovery, in particular hydrocarbons.

The method according to the invention is in particular intended to limit the impact of the facility on the fauna located around the facility, in particular on birds such as migratory birds passing near the facility.

BACKGROUND OF THE INVENTION

The populations of migratory birds flying in the Earth's atmosphere are under pressure. The environment is being modified by multiple factors, including increased land use, climate change, etc.

Several species are classified by the IUCN (International Union for Conservation of Nature) as "vulnerable" (VUL), "endangered" (EN) or "critically endangered" (CR).

In order to protect migratory birds and improve the resilience of ecosystems, several treaties have been signed throughout the world. European Union countries have in particular established the Bird directives, in order to ensure better protection for migratory birds.

Several human activities have been identified as dangerous, or even fatal for migratory birds. This is in particular the case for the lighting of offshore facilities, or urban lighting produced at high intensities, for example that produced in sports stadiums.

In the case of hydrocarbon exploitation facilities, migratory bird flows are occasionally attracted by the flares of the facilities, which have a very substantial light intensity. More surprisingly, bird flows are also disrupted by these facilities when they are not equipped with flares or when they do not use their flare.

Most often, the migratory birds accumulate around open sky illuminated facilities at night. This causes them a delay in their migration, wasted energy, and therefore increased exhaustion, and increased vulnerability to predators.

To address this issue, light intensity attenuation measures have been proposed in the EIA (Energy Information Offshore) for offshore facilities.

A first measure consists of using green and/or blue lights instead of yellow and/or orange lights. Nevertheless, it has not been universally established that birds do not see green or blue. These measures have been implemented successfully in the North Sea, but in the southern hemisphere, certain bird populations on the contrary appear to be more attracted by green light.

Another measure consists of providing a birdcage on the facility used at night as a refuge for the birds.

Such a measure is not fully satisfactory. Catching birds, even exhausted ones, to place them safely in a birdcage can prove dangerous for operators on the offshore facility. Furthermore, migratory birds generally fly in a flock and cannot be isolated without risking losing their migratory route.

SUMMARY OF THE INVENTION

One aim of the invention is therefore to provide a method making it possible, effectively and universally, to limit the impact of a facility illuminated at night, on the flows of birds that may circulate around the facility.

To that aim, the invention relates to a method of the aforementioned type, characterized in that it comprises the following steps:

determining predictive meteorological data in a region surrounding the facility;

querying a database of presence of birds in the region surrounding the facility;

calculating, via a prediction unit, a probability of passage of birds passing opposite the facility as a function of time, on the basis of the predictive meteorological data and data of presence of birds in the region surrounding the facility;

controlling, via a control unit, at least one light source of the facility, on the basis of the probability of passage, calculated by the prediction unit.

The method according to the invention may comprise one or more of the following features, considered alone or according to any technically possible combination:

the method is implemented by a system for controlling the light intensity of a facility;

the control of at least one light source of the facility includes reducing the light intensity of the or of each light source of the facility when the probability of passage calculated by the prediction unit increases;

the control of at least one light source of the facility includes maintaining a minimal light intensity of the or each light source of the facility irrespective of the probability of passage calculated by the prediction unit;

the control of at least one light source of the facility includes, in case of emergency, activating at least one light source of the facility at a backup intensity by a backup unit, independently of the probability of passage calculated by the prediction unit;

the determination of predictive meteorological data includes measuring local meteorological parameters at the facility via a weather station, and establishing predictive meteorological data in the region via a determining application, from local meteorological parameters measured at the facility;

the determination of predictive meteorological data includes querying a database containing online predictive meteorological data;

the determination of predictive meteorological data includes a comparison between the predictive meteorological data obtained from measured local meteorological parameters, and the predictive meteorological data obtained from the database containing online predictive meteorological data;

it includes querying a maintenance database of the facility in order to determine at least one potential maintenance date and/or time scheduled on the facility, and recovering the probability of passage calculated by the prediction unit on the potential maintenance date and/or time.

The invention also relates to a system for controlling the light intensity of a facility, including:
- a database about the presence of birds in the region surrounding the facility;
- a prediction unit able to determine predictive meteorological data in a region surrounding the facility, the prediction unit being able to query the bird presence database in order to calculate a probability of passage of birds passing opposite the facility as a function of time, based on predictive meteorological data, and bird presence data in the region surrounding the facility;
- a control unit of at least one light source of the facility, on the basis of the probability of passage, calculated by the prediction unit.

The system according to the invention may comprise one or more of the following features, considered alone or according to any technically possible combination:
- the control unit of at least one light source of the facility is able to reduce the light intensity of the each light source of the facility when the probability of passage calculated by the prediction unit increases;
- the control unit of at least one light source of the facility is able to maintain a light intensity of the each light source of the facility irrespective of the probability of passage calculated by the prediction unit;
- it includes a security unit, able to activate at least one light source of the facility independently of the probability of passage calculated by the prediction unit;
- it comprises a meteorological data collection unit including a weather station able to measure local meteorological parameters at the facility, and a meteorological tracking system, the prediction unit being able to determine predictive meteorological data in the region located around the facility from measured local meteorological parameters;
- the prediction unit is able to query a database containing online predictive meteorological data.

The invention also relates to a fluid prospecting, exploitation and/or recovery facility including:
- a structure;
- at least one fluid prospecting, production and/or recovery unit;
- a lighting assembly of the facility;
- a system for controlling the light intensity created by the facility, as defined above, the control system being able to control the lighting assembly.

The facility according to the invention is advantageously a facility located in a body of water, in particular a floating facility.

BRIEF DESCRIPTION OF THE DRAWINGS

The invention will be better understood upon reading the following description, provided solely as an example, and in reference to the appended drawings, in which.

DESCRIPTION OF PREFERRED EMBODIMENTS

Figure 1:
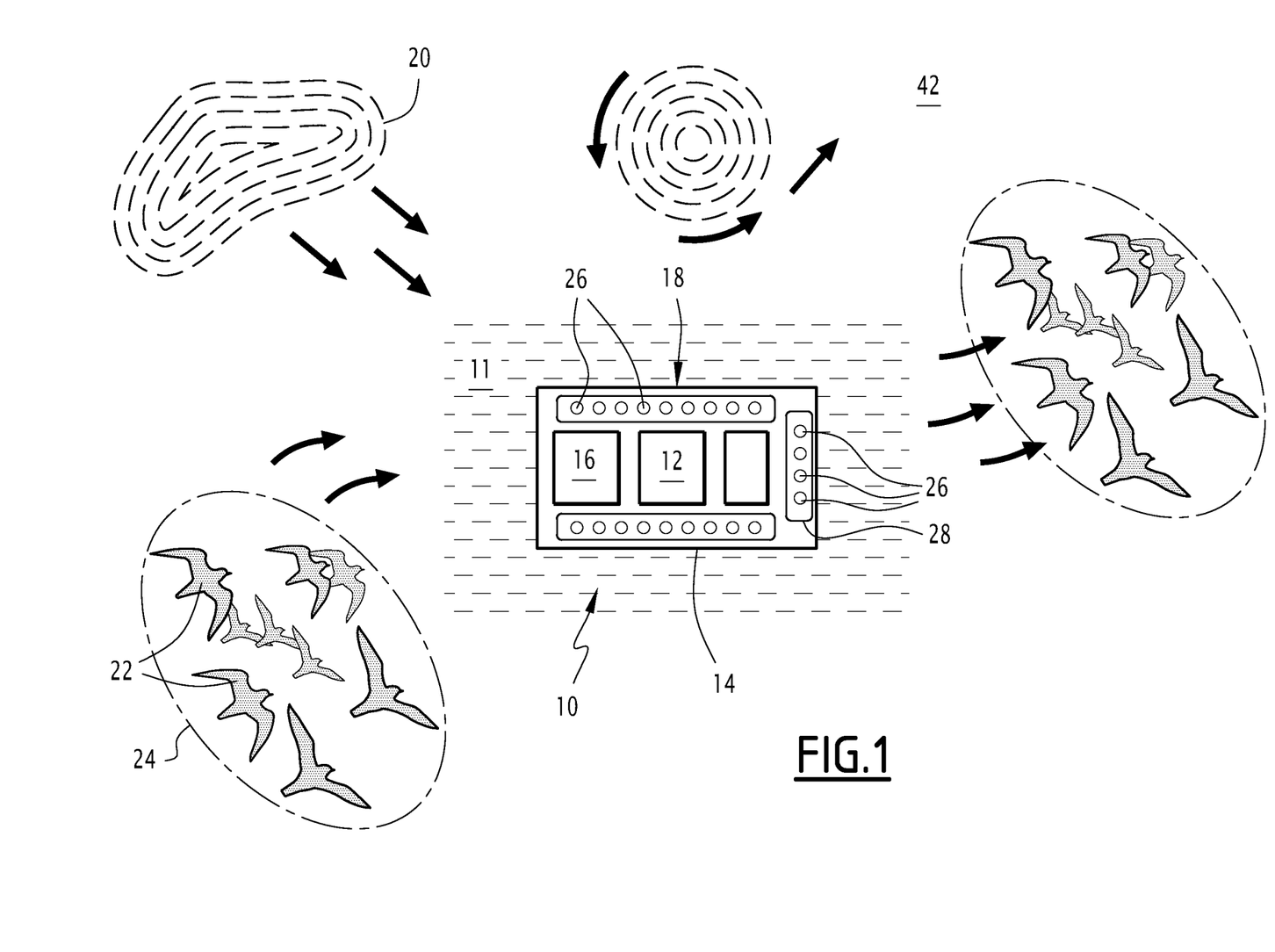
FIG. 1 is a schematic top view, illustrating a first facility provided with a control system according to the invention, in an environment including bird flows.
Figure 2:
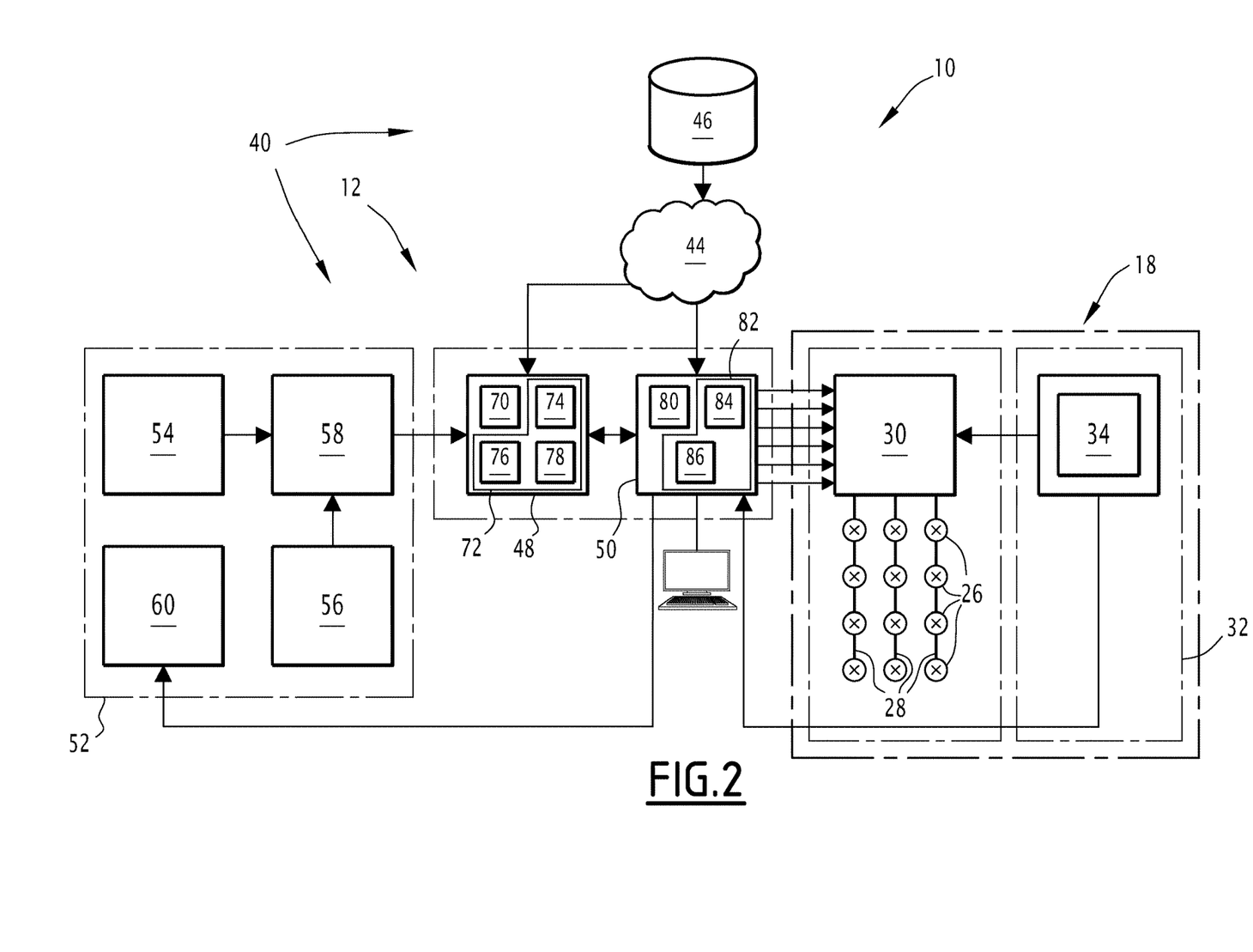
FIG. 2 is a block diagram showing the control system of the facility of FIG. 1.

FIGS. 1 and 2 schematically illustrate a first facility 10 provided with a light intensity control system 12 according to the invention.

The facility 10 is for example a facility located in a body of water 11, such as an ocean, a sea, a lake or a river.

The facility 10 is for example floating. It is advantageously formed by a surface naval support that may for example be a Floating Production, Storage and Offloading (FPSO) unit, a Floating Liquefied Natural Gas (FLNG) unit, a semisubmersible platform, which may for example be a Tension Leg Platform (TLP), an unloading buoy, a floating vertical column or a ship. In a variant, the facility 10 is a fixed rigid structure of the "jacket" type or an oscillating structure subject to the seabed.

In a variant, as will be described later, the facility 10 is an on shore facility.

In reference to FIG. 1, the facility 10 includes a structure 14 and advantageously at least one unit 16 for fluid prospecting, production and/or recovery, in particular for hydrocarbons.

The facility 10 further includes a lighting assembly 18 and the light intensity control system 12, able to control the lighting assembly 18.

The facility 10 is located in an environment including circulating masses of air 20. The environment of the facility 10 further includes birds 22, in particular groups 24 of birds 22 flying around the facility 10. The birds 22 are for example migratory birds.

The lighting assembly 18 here includes a plurality of light sources 26. The light sources 26 are for example electric sources, such as bulbs and/or projectors. In a variant, the light sources 26 comprise thermal sources, such as flares.

In the example illustrated in FIG. 2, the lighting assembly 18 includes a plurality of lighting lines 28 each including at least one light source 26, and a power distribution board (PDB) 30 connected to each lighting line 28.

The lighting assembly 18 further includes a backup unit 32, able to guarantee backup lighting.

In this example, each lighting line 28 is connected to the distribution board 30 to be controlled selectively in terms of light intensity by the distribution board 30. The lines 28 here are shown with light sources 26 in series, although bypasses and parallel sources 26 can also be provided on each line 28.

The power distribution board 30 is able to selectively adjust the light intensity of each light source 26 between a maximum value and a minimum value required to guarantee the safety of the operators present in the facility 10.

During normal operation, the power distribution board 30 is controlled by the control system 12.

In case of emergency, the backup unit 32 is able to control the distribution board 30 directly. It for example includes an integrated control and safety system (ICSS) 34.

In reference to FIG. 2, the control system 12 includes a meteorological data collection unit 40 in an region 42 located around the facility 10, an interface 44 for querying a database 46 for the presence of birds 22 in the region 42 surrounding the facility 10, and a prediction unit 48 connected to the collection unit 40 and the query interface 44 in order to calculate a probability of passage of a flow of birds 22 across from the facility 10 as a function of time.

The control system 12 further includes a control unit 50 of the light sources 26 as a function of the calculated probability of passage, connected to the lighting assembly 18.

In the example illustrated in FIG. 2, the collection unit 40 is formed by a weather station 52. The weather station 52 includes sensors 54, at least one master clock 56, and a meteorological tracking system 58 connected to the sensors 54 and the clock 56.

Advantageously, the collection unit 40 includes a remote supervision system 60.

The sensors 54 are for example sensors for measuring the speed and direction of the wind, temperature measuring sensors and/or atmospheric pressure measuring sensors.

The sensors 54 are located locally on the facility 10 or near the latter in the region 42.

The clock 56 is able to allow a detection of the measurements taken by the sensors 54. It is connected to the meteorological tracking system 58.

The meteorological tracking system 58 is able to collect the meteorological parameters measured locally by the sensors 54 and the temporal data received from the clock 56. Advantageously, the system 58 includes at least one computer provided with a processor and a memory containing software applications able to be executed by the processor. The memory contains at least one data collection application of the sensors 54 and of the clock 56. The collection application is able to recover the analog and digital data from the sensors 54 and to display them and/or integrate them into a temporal database.

The remote supervision system 60 is able to display the malfunction information of the weather station systems 52.

The database 46 of presence of birds contains information on the type, position and/or altitude of birds 22 moving toward the region 42 located around the facility 10.

The database 46 is for example a database accessible by Internet, in particular. Movebank for Animal Tracking Data (https://www.movebank.org/)—the data from this database are accessible on demand and with permission.

The database 46 is generally off-site relative to the facility 10. It can be queried remotely using the interface 44.

The interface 44 is for example a data transmission network, such as the Internet, in particular working according to the TCP/IP protocol.

The production unit 48 is able to query the collection unit 40 and the bird presence database 46 through the interface 44 in order to calculate a probability of the passage of a flow of birds 22 opposite the facility 10 as a function of time, based on meteorological data provided by the collection unit 40, and data on the presence of birds 22 in the region 42 surrounding the facility 10, obtained in the database 46.

Advantageously, the prediction unit 48 includes a computer comprising at least one processor 70 and a memory 72 containing software applications able to be executed by the processor 70.

The memory 72 preferably contains an application 74 for determining predictive meteorological data from measurements collected by the weather station 52, an application 76 for recovering bird movement data 22, from the database 46, through the interface 44, and an application 78 for calculating a probability of bird passage 22 across from the facility 10 as a function of time.

The determining application 74 is able to establish a meteorological prediction as a function of time in the region 42 located around the facility 10, based on a meteorological model and local meteorological parameters measured by the sensors 54 of the weather station 52.

The predictive meteorological data are for example the speed and the direction of the wind, the atmospheric pressure, the temperature, the precipitation at a plurality of points of the region 42, at different latitudes, longitudes and altitudes.

Thus, the determining application 74 is able to determine, over time, the speed and direction of air mass flows 20 around the facility 10, at different altitudes, able to accommodate birds 22 in flight.

The calculating application 78 is thus able to use the predictive meteorological data, in particular the wind speeds and the air mass flows at different points around the facility 10, over time, the predicted movement of the groups 24 of birds 22 as a function of time, from known positions of the groups 24 of birds 22 taken from the database 46, and a mathematical movement model.

Figure 3:
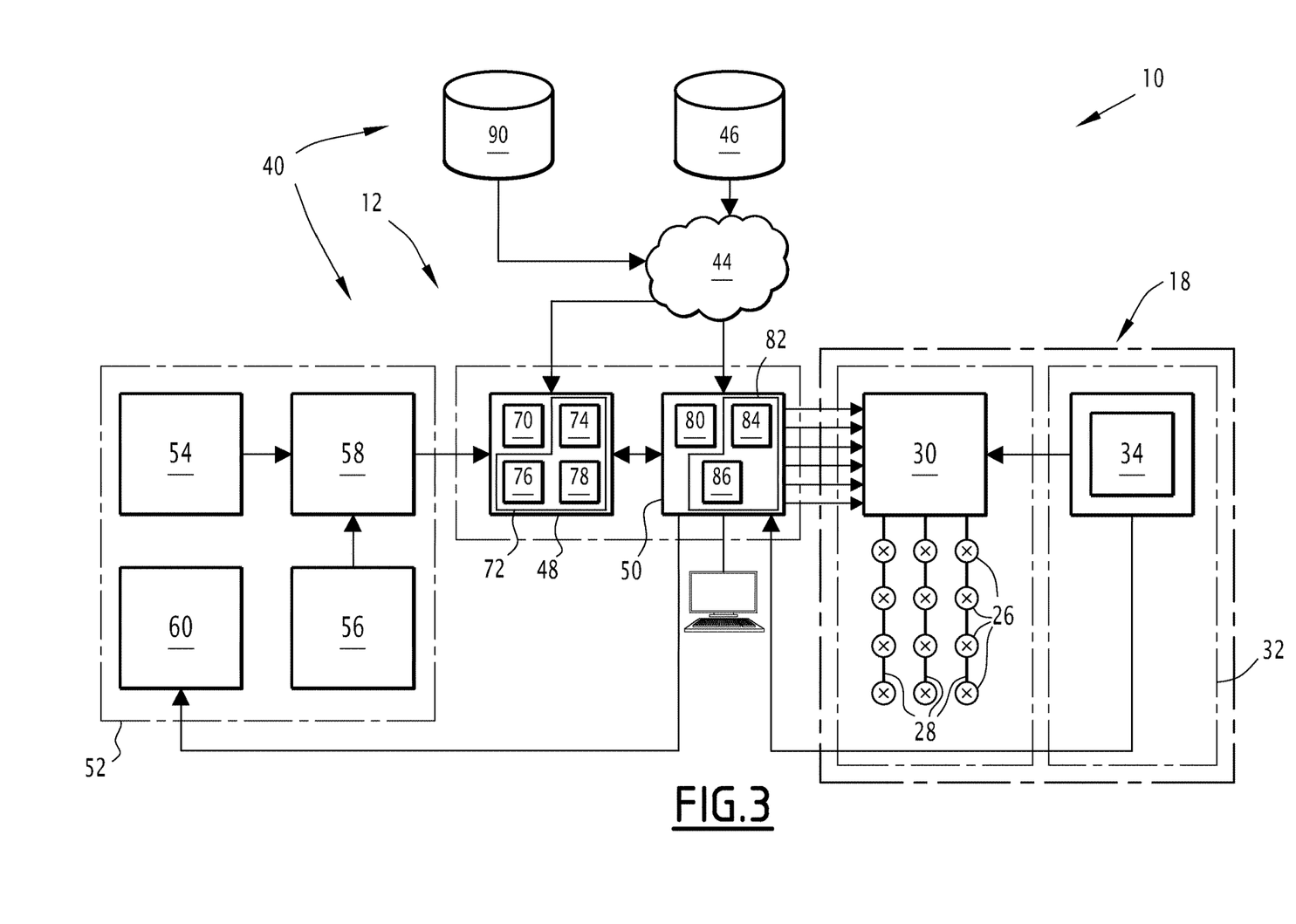
FIG. 3 is a view similar to FIG. 2 for a second facility according to the invention.
Figure 4:
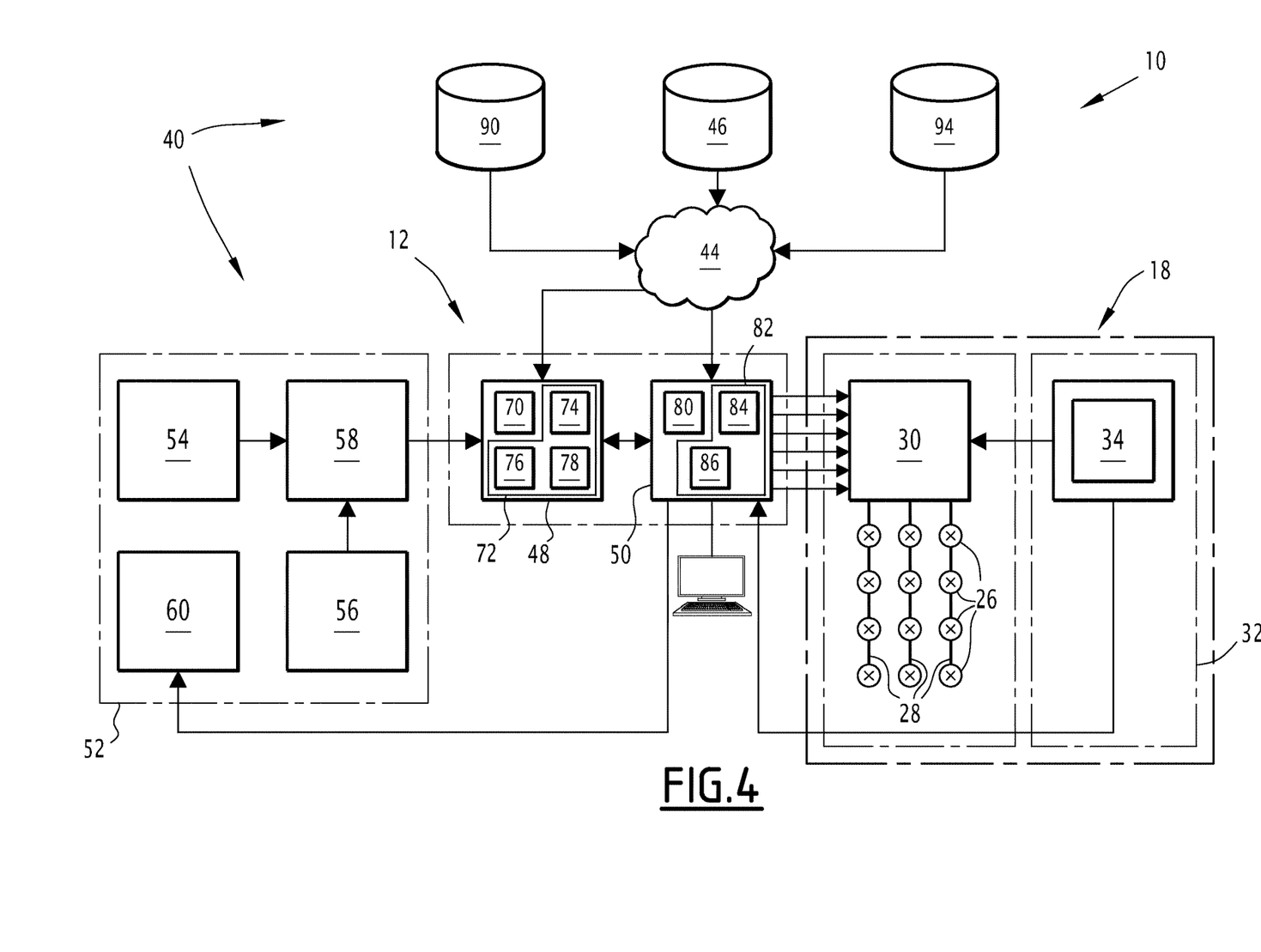
FIG. 4 is a view similar to FIG. 2 for a third facility according to the invention.

This calculation makes it possible to obtain a probability of passage of birds 22 across from the facility 10 as a function of time, in a time interval for example of between one hour and several days (from several hours to 3 days for FIG. 2, from several hours to 10 days for FIGS. 3 and 4). This probability is for example calculated at a frequency of between one hour and one day.

The control unit 50 is for example a programmable logic controller (PLC).

The control unit 50 is connected to the prediction unit 48 and the lighting assembly 18. It is able to control the lighting assembly 18 in order to adjust the intensity of the light sources 26 as a function of the probability of passage calculated by the prediction unit 48.

The control unit 50 for example includes a computer provided with at least one processor 80 and a memory 82 containing applications able to be executed by the processor.

The memory 82 in particular contains an application 84 for recovering passage probabilities calculated as a function of time by the prediction unit 48, and an application 86 for generating a command of the lighting assembly 18, in particular of the distribution board 30, as a function of the calculated passage probabilities.

In particular, the generating application 86 is able to create a command of the distribution board 30 in order to reduce the light intensity of light sources 26 of at least one line 28 when the calculated probability of passage increases over time, for example goes above a predetermined threshold, or a predetermined gradient.

The reduction of the light intensity is for example done gradually over time, the reduction being maximal when the probability of passage is maximal.

During operation, irrespective of the calculated probability of passage, the control unit 50 is able to maintain a minimal light intensity of the or each light source 26 of the facility 10 in order to guarantee the safety of the operators of the facility 10 when the facility 10 is active.

In case of emergency, the backup unit 32 is able to control the control unit 50 directly, in order to guarantee backup lighting, independently of the probability of passage calculated by the prediction unit 48.

The backup lighting for example consists of illuminating at least one light source 26 at a backup intensity greater than the minimum light intensity defined above, even if the probability of passage calculated by the prediction unit 48 imposes keeping the light intensity minimal.

The method for controlling the light intensity of the facility 10 according to the invention, implemented using the control system 12, will now be disclosed.

In real time, the sensors 54 of the weather station 52 read local meteorological parameters near the facility 10 and the clock 56 reads time data that feed the data collection applications of the meteorological tracking system 58.

In parallel, the database 46 is supplied by positioning data of birds 22 in the region 42.

The application 74 for determining predictive meteorological data, and the application 76 for recovering positioning data of birds 22, are then activated by the prediction unit 48.

Based on measured local meteorological parameters, the determining application 74 then establishes predictive meteorological data, such as the speed and the direction of the wind, the atmospheric pressure, the temperature, the precipitation at a plurality of points of the region 42 over time, in a time interval as defined above.

The applications 74, 76 feed the calculating application 78 of the prediction unit 48, which calculates a probability of passage of birds 22 opposite the facility 10 as a function of time in the aforementioned time interval, and the chosen frequency as defined above.

The probability of passage as a function of time calculated by the prediction unit 48 is recovered by the recovery application 84 of the control unit 50. As a function of this probability of passage, the generating application 86 creates a command of the distribution board 30.

In particular, when the probability of passage increases over time, for example when the probability of passage or the probability of passage gradient passes above a determined threshold, the command provides for decreasing the light intensity of each source 26. This decrease is for example gradual over time. It is limited to maintain a minimal light intensity in the facility 10 required for the safety of each operator of the facility 10.

Thus, the light intensity of the facility 10 is adapted over time as a function of the presence of birds 22 in the surroundings of the facility 10. In particular, the light intensity is greatly attenuated when this probability increases significantly, which reduces the risk of disruptions on the fauna flying around the facility 10.

This attenuation of the impact of the facility 10 on the birds 22 is a function of the type of bird 22. It is further highly effective.

In the variant illustrated by FIG. 3, the prediction unit 48 also includes an interface for querying a database 90 containing online predictive meteorological data.

This interface is for example the interface 44. The database 90 is for example a short-term meteorological forecasting system, such as the PEARP system by Météo France or the EPS and/or CEP systems.

The method then includes querying the database 90 via the interface 44 in order to obtain additional predictive meteorological data in addition to the predictive meteorological data obtained by the application 74 via the weather station 52.

The method also includes a comparison of the predictive meteorological data obtained from the local weather station 52 and additional predictive meteorological data obtained form the database 90 to determine which data are the most precise. The choice of the predictive model is for example determined by:

1/ the time of the year (meteorology that may or may not involve stratospheric phenomena);

2/ the distance of the birds 22 relative to the facility 10; and/or

3/ the studied prediction period.

The most precise predictive meteorological data are then used by the prediction unit 48, in order to calculate the probability of passage as a function of time, as previously disclosed.

In the variant illustrated by FIG. 4, the control unit 50 is able to query a maintenance database 94 on the facility 10, for example through the interface 44, in order to obtain potential maintenance dates and/or times provided on the facility 10.

If at least one potential maintenance date and/or time occurs when a calculated probability of passage exceeds a given threshold, or a given gradient, the generating application 86 is able to report a conflict with the potential maintenance date and/or time, or even to modify the potential maintenance date and/or time in the database 94.

It is thus possible to effectively synchronize the maintenance operations on the facility 10 while minimizing their impact on the outside environment.

In the variant where the facility 10 is located on land, the facility 10 is for example a plant operating continuously or a large urban facility. It comprises a structure 14, a lighting assembly 18 of the facility 10, and a system 12 for controlling the light intensity created by the facility 10, as disclosed above.

The invention claimed is:

1. A method for controlling a light intensity of a facility, comprising:
   determining predictive meteorological data in a region surrounding the facility;
   querying a birds presence database comprising data of presence of birds in the region surrounding the facility;
   calculating, via a prediction calculator, a probability of passage of birds passing opposite the facility as a function of time, based on the predictive meteorological data and on data of presence of birds in the region surrounding the facility;
   controlling, via a controller, at least one light source of the facility, based on the probability of passage calculated by the prediction calculator.

2. The method according to claim 1, wherein controlling the at least one light source of the facility comprises reducing the light intensity of the at least one light source of the facility when the probability of passage calculated by the prediction calculator increases.

3. The method according to claim 2, wherein controlling the at least one light source of the facility comprises maintaining a minimal light intensity of the at least one light source of the facility, irrespective of the probability of passage calculated by the prediction calculator.

4. The method according to claim 2, wherein controlling the at least one light source of the facility comprises, in case of emergency, activating at least one light source of the facility at a backup intensity by a backup unit, independently of the probability of passage calculated by the prediction calculator.

5. The method according to claim 1, wherein determining predictive meteorological data comprises measuring local meteorological parameters at the facility via a weather station, and establishing predictive meteorological data in the region via a determining application, from local meteorological parameters measured at the facility.

6. The method according to claim 1, wherein determining predictive meteorological data comprises querying a database containing online predictive meteorological data.

7. The method according to claim 5, wherein determining predictive meteorological data comprises querying a database containing online predictive meteorological data, determining predictive meteorological data also comprising comparing the predictive meteorological data obtained from measured local meteorological parameters, and the predictive meteorological data obtained from the database containing online predictive meteorological data.

8. The method according to claim 1, comprising querying a maintenance database of the facility in order to determine at least one potential maintenance date and/or time scheduled on the facility, and recovering the probability of passage calculated by the prediction calculator on the potential maintenance date and/or time.

9. A system for controlling a light intensity of a facility, including:
- a birds presence database comprising data of presence of birds in the region surrounding the facility;
- a prediction calculator configured to determine predictive meteorological data in a region surrounding the facility, the prediction calculator being configured to query the birds presence database in order to calculate a probability of passage of birds passing opposite the facility as a function of time, based on predictive meteorological data, and on data of presence of birds in the region surrounding the facility;
- a controller of at least one light source of the facility, based on the probability of passage, calculated by the prediction calculator.

10. The system according to claim 9, wherein the controller of the at least one light source of the facility is configured to reduce the light intensity of the at least one light source of the facility when the probability of passage calculated by the prediction calculator increases.

11. The system according to claim 10, wherein the controller of the at least one light source of the facility is configured to maintain a light intensity of the at least one light source of the facility irrespective of the probability of passage calculated by the prediction calculator.

12. The system according to claim 10, comprising a security unit configured to activate the at least one light source of the facility independently of the probability of passage calculated by the prediction calculator.

13. The system according to claim 9, comprising a meteorological data collector including a weather station configured to measure local meteorological parameters at the facility, and a meteorological tracking system, the prediction calculator being configured to determine predictive meteorological data in the region located around the facility from measured local meteorological parameters.

14. The system according to claim 9, wherein the prediction calculator is configured to query a database containing online predictive meteorological data.

15. The system according to claim 9, wherein the controller is configured to query a maintenance database of the facility in order to determine at least one potential maintenance date and/or time scheduled on the facility, the controller being configured to recover the probability of passage calculated by the prediction calculator on the potential maintenance date and/or time.

* * * * *